Patented Dec. 27, 1938

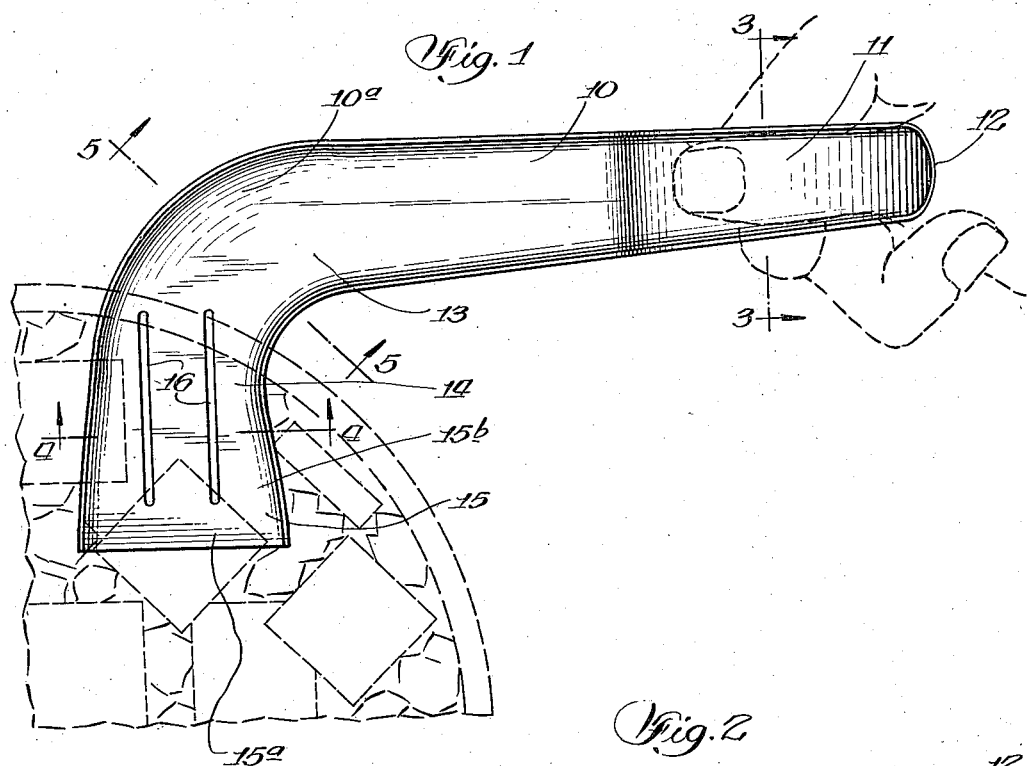
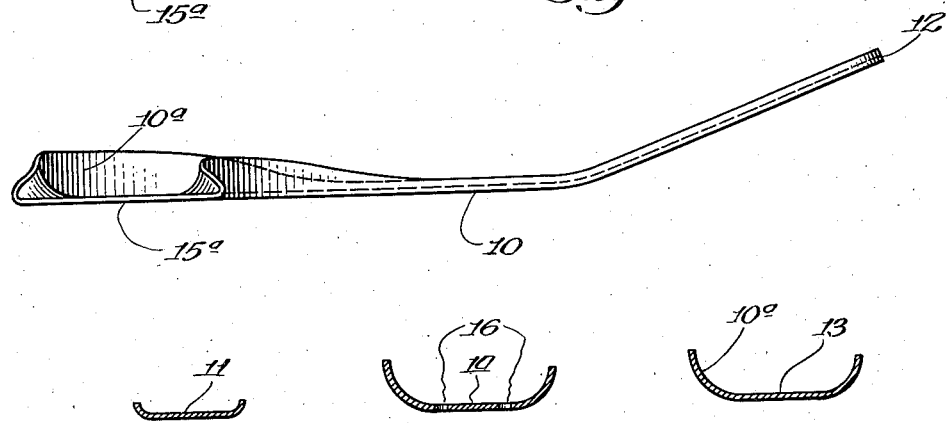

2,141,367

UNITED STATES PATENT OFFICE 2,141,367

BUTTER SERVING IMPLEMENT

Joseph M. Yannuzzi, Chicago, Ill.

Application January 6, 1938, Serial No. 183,726

1 Claim. (Cl. 65—12)

My invention relates to restaurant utensils, and more particularly to those in connection with the serving of butter, and my main object is to provide a novel and handy implement for picking squares of butter out of the plate in which they are chilled.

A further object of the invention is to provide an implement in the nature of a lifter, which may be easily slid under the butter square desired to be picked up from the dish, whereby to support such square for transfer to the customer's plate.

A still further object of the invention is to design the novel implement with the handle in a forward direction and the operative portion extended in a lateral direction, whereby to facilitate the handy engagement of the butter square.

Another object of the invention is to lend the implement such a formation as to limit the receiving area for the butter square to the portion engaging the latter, in order that the butter square may be readily transferred from the implement.

An additional object of the invention is to form the receiving portion of the implement with openings for the drainage of water from the butter.

A significant object of the invention is to lend the handle of the implement a rising formation at the point where it is held, in order to avoid the wetting of the hand in the chilling dish.

An important object of the invention is to construct the same of one piece of sheet metal, whereby to be economically manufactured and of utmost simplicity.

With the above objects in view and with any others that may suggest themselves from the description to follow, a better understanding of the invention may be had by reference to the accompanying drawing, in which:—

Fig. 1 is a plan view of the novel implement, showing the manner in which it is handled and applied;

Fig. 2 is a front elevation; and

Figs. 3, 4 and 5 are, respectively, sections on the lines 3—3, 4—4 and 5—5 of Fig. 1.

The serving of butter in restaurants is usually in the form of squares laid in individual plates. In order that a supply of butter squares may be kept in chilled condition, they are first deposited in a dish which contains a layer of cracked ice, being removed one by one as required. Usually, the removal of a butter square from the chilling dish is by means of a fork, but more or less difficulty is had to detach the particular butter square from the fork for transfer to the individual plate. The fork is in most cases maneuvered or pressed against the plate to release the butter square from it without the use of manual assistance, but frequently it is necessary to use the fingers of the other hand to remove the square from the fork. This process not only involves difficulty and delay, but also subjects the butter square to contamination from unclean fingers, or at least makes the job a messy one. It has therefore been my intention to depart from the inefficient and unsanitary method of serving butter squares just outlined by the provision of an implement which accomplishes the task quickly, easily and cleanly.

In accordance with the foregoing, specific reference to the drawing indicates the shank of the novel implement at 10. The implement is made from light but sturdy sheet metal, and preferably stamped into the form shown. Thus, the shank 10 is in channeled form, as more clearly shown in Fig. 3, and the handle portion 11 of the device extends back from the shank with a rising slant, as indicated in Fig. 2, its terminus being rounded off, as shown at 12.

The shank 10 of the implement takes a lateral curvature toward the front, as indicated at 13, to form a section 14 which is considerably wider than the shank. This section expands to terminate with a flat section 15 presenting a straight edge 15a. While the implement is formed with an upstanding rim flange 10a along the major portion of its course, such flange is gradually tapered off at the sides of section 15 as indicated at 15b to disappear as the straight edge 15a is reached.

When the device is to be used, the handle is grasped as indicated by dotted lines in Fig. 1, the thumb of the hand seating in the channel of the handle 11, while the other fingers are underneath the latter to form a support. The implement is then advanced in a lateral direction to engage the nearest butter square from underneath in the manner of a shovel, the straight edge 15a facilitating the advance of the implement until a sufficient support is secured for the square. The latter is then carried to the point where it is transferred to the plate in which it is to be served by simply being slid off the portion 15.

The implement will be coated with a high gloss enamel or plated with a high polish, in order that the engagement of the butter square when it is to be picked up, or its discharge may be facilitated. These actions will be aided by the fact that the ice in the chilling dish is usually surrounded by water, so that the implement is moist or wet when handling the butter.

In order that the implement may not carry any water when taking up a square of butter, I have formed two slots 16 in the supporting portion 14 so that what water may accompany the butter square will drain from the implement when the latter is raised from the chilling dish. Also, in order that the hand may not touch the counter or the contents of the chilling dish in case a longer reach is necessary to pick up a square of butter, the slant of the handle 11 is of advantage, raising the position of the hand.

It will be evident from the above description that I have provided an implement which is exceedingly handy for the present purpose. It replaces the usual fork and the difficulties connected therewith, and makes it unnecessary to apply the other hand or fingers thereof to touch or handle the butter. Usually, the uneven support provided by the cracked ice in the chilling dish places corners of the butter squares advantageously for the engagement and advance of the forepart of the implement so that no difficulty is had in picking up the butter square. Likewise, the smooth or slippery surface of the said forepart makes for the rapid discharge of the same. The decided reduction in the width of the implement back of the receiving portion precludes the sliding of the butter square in the direction of the handle. Finally, it will be evident that an implement constructed as described is of exceeding simplicity, and may be produced at low cost.

I claim:—

A butter serving implement, comprising a substantially L-shaped body, the upper surface of said body being formed to provide a continuous channel, the channel of the short leg of said body being flattened and flared outwardly at its free end to provide a substantially wedge-shaped butter square receiving portion of a size to limit the entry of a butter square therein, the longer leg of said body comprising a handle and a channel thereof providing a thumb receiving portion.

JOSEPH M. YANNUZZI.